Patented Dec. 22, 1942

2,306,071

UNITED STATES PATENT OFFICE 2,306,071

RESINOUS ESTERS AND PROCESS FOR PREPARING THEM

James G. McNally and Russel H. Van Dyke, Rochester, N. Y., assignors to Eastman Kodak Company, Rochester, N. Y., a corporation of New Jersey No Drawing. Application December 30, 1938, Serial No. 248,496

13 Claims. (Cl. 260—78)

This invention relates to resinous esters and to a process for preparing the same. More particularly, this invention relates to resinous esters which are prepared from heteropolymers of unsaturated α, β-dicarboxylic acids or their anhydrides and vinyl organic acid esters.

Heteropolymers of unsaturated α, β-dicarboxylic acid anhydrides and vinyl organic acid esters are known. These are ordinarily prepared by polymerizing a mixture of an unsaturated α, β-dicarboxylic acid anhydride with a vinyl organic acid ester. For example, polymerization of a mixture of maleic anhydride and vinyl acetate yields a heteropolymer which can be formulated as follows:

I 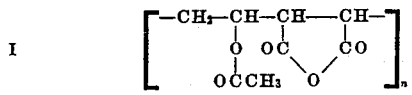

This heteropolymer is a brittle substance and soluble in acetone and pyridine. Saponification of the heteropolymer yields products which are water soluble.

Treatment of the heteropolymer I with water gives a hydrate which can be formulated as follows:

II 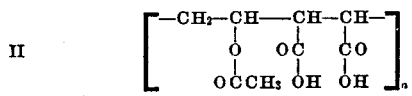

This hydrate is, in effect, a heteropolymer of vinyl acetate and maleic acid. It is water soluble.

Saponification of the hydrate II with alkali gives a substance which can be formulated as follows:

III 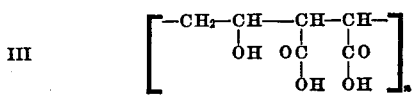

This substance is, in effect, a heteropolymer of vinyl alcohol and maleic acid.

A second kind of mixed polymer can be prepared by polymerizing a mixture of an unsaturated α, β-dicarboxylic acid diester with vinyl organic acid esters. For example, polymerization of a mixture of diethyl maleate and vinyl acetate yields a mixed polymer which can be formulated as follows:

IV 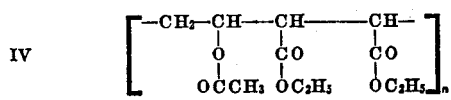

Such mixed polymers are alkali insoluble and soluble in organic solvents. However, such mixed polymers are very thermoplastic substances at ordinary temperatures. Saponification of such mixed polymers yields water soluble products.

The heteropolymer of maleic anhydride and vinyl acetate has been treated with methyl alcohol, in the presence of benzylnaphthalene sulfonic acid, to give a water soluble substance. In this case a large proportion of the acetyl groups in the heteropolymer are apparently removed. Removal of a smaller proportion of the acetyl groups leads to products of higher acetyl group content and lesser solubility in water.

The mixed polymer of dimethylmaleate and vinyl acetate has been treated with methyl alcohol, in the presence of isobutylnaphthalene sulfonic acid, to give likewise a water soluble substance. Again only partial removal of the acetyl groups gives a substance of higher acetyl group content and lesser solubility in water.

We have now found a new kind of resin which we prepare from polymers, such as those formulated under I and II above. We prepare our new resins by deesterifying, with a monohydric alcohol, acyl groups from a heteropolymer of a vinyl organic acid ester and an unsaturated α, β-dicarboxylic acid or its anhydride, and esterifying, with a monohydric alcohol, the acid or anhydride groups in the heteropolymer, and forming a lactone from the resulting product. Thus, in the case of the heteropolymer of vinyl acetate and maleic anhydride, we remove acetyl groups with a monohydric alcohol and esterify anhydride groups with a monohydric alcohol and form a lactone from the resulting product. Our new resins are entirely unlike the known polymers set forth above. For example, our new resins are not water soluble and are not highly thermoplastic and are much less brittle than the known polymers. Our new resins can be formulated as follows:

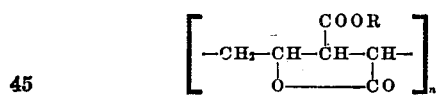

wherein R represents an alcohol radical or group. Since our new resins ordinarily contain a small acyl group content and a small carboxyl group content, it is probable that the resins contain small amounts of a material having the following formula:

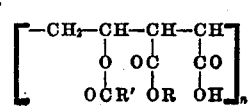

wherein R represents an alcohol (alkyl) group and OCR' represents an acyl group. Our new resins can be defined as resinous esters of the heteropolymer of the lactone of vinyl alcohol and an unsaturated α, β-dicarboxylic acid. Our new resins can also be defined as resinous esters of a heteropolymer of a vinyl organic acid ester and an aliphatic unsaturated α, β-dicarboxylic acid or its anhydride, which contain not more than a small acyl group content and not more than a small carboxyl group content.

From our new resins we have found that excellent film or sheet can be made. We have found that such film or sheet can be coated with light-sensitive photographic coatings to give finished photographic elements. We have further found that our new resins can be employed to manufacture laminated elements, such as safety glass. We have further found that our new resins can be plasticized and that such plasticized material can be employed to manufacture film and laminated elements. We have further found that our new resins can be extruded into the form of sheets or threads. The threads, we have found, can be spun. Our new resins when suitably plasticized can be employed in the manufacture of molded articles.

It is, therefore, among the objects of our invention to provide new resins and to provide a process for preparing them. A further object is to provide film or sheet from such new resins. A further object is to provide a plasticized composition containing our new resins. A further object is to provide threads of our new resins. Other objects will become apparent upon a complete perusal of this specification.

In preparing our new resins, we employ as starting material a heteropolymer of an unsaturated α,β-dicarboxylic acid or its anhydride (such as maleic acid or its anhydride or itaconic acid or its anhydride for example) and a vinyl organic acid ester (such as vinyl acetate, vinyl propionate or vinyl benzoate for example). We remove (de-esterify) acyl groups from the heteropolymer and esterify the carboxylic acid groups (or anhydride groups of the heteropolymer) and form a lactone from the resulting product. According to a preferred embodiment of our invention, we treat a heteropolymer of the aforesaid character with a monohydric alcohol, advantageously a primary monohydric alcohol, in the presence of a mineral acid catalyst, said acid having a strength of the order of sulfuric acid. During the treatment, acyl groups are removed, carboxylic acid (or anhydride) groups are esterified and then an inner condensation takes place to give a lactone. When treating a heteropolymer of an anhydride of an unsaturated α, β-dicarboxylic acid and a vinyl organic acid ester with an alcohol, it is advantageous to incorporate water in the reaction mixture.

While the process of preparing our new resins is subject to variation particularly as respects the nature and quantity of the heteropolymer employed, the nature and quantity of the alcohol employed, the manner of effecting the lactone condensation, the temperatures employed, and the manner of isolating and purifying the resins, the following examples will serve to illustrate the manner of obtaining our resins. These examples are not intended to limit our invention.

EXAMPLE 1

*Methyl ester*

500 g. (2.7 mol.) of the heteropolymer of vinyl acetate and maleic anhydride were dissolved in 3500 cc. (86.5 mol.) of methanol and 50 cc. (2.8 mol.) of distilled water, at room temperature over a period of several hours. To the resulting solution, 178.5 cc. of sulfuric acid (100%) dissolved in 500 cc. (12 mol.) of methanol were added. The resulting solution was heated on a steam bath and under reflux for about 4¼ hours. At this time a precipitate had formed. The liquid was decanted off. The precipitate was dissolved in about one liter of acetone and five more liters of acetone were added to dilute the solution. The solution was filtered under pressure through felt. The filtered solution was poured slowly into vigorously agitated cold water to precipitate the resin. The precipitated resin was dissolved in six liters of acetone and again precipitated in cold water. The re-precipitated resin was thoroughly washed with water and dried, in the air. The resin was found to contain an acyl group content (calculated as vinyl acetate) equivalent to about 12.2% of the weight of the resin and a carboxyl group content (calculated as maleic acid) equivalent to about 6.8% of the weight of the resin.

EXAMPLE 2

*Ethyl ester*

490 g. (2.65 mol.) of the heteropolymer of vinyl acetate and maleic anhydride were dissolved in 945 g. of 95% ethyl alcohol and 1750 cc. of absolute ethyl alcohol by shaking the materials together for several hours. The solvent contained about 50 mol. of ethyl alcohol and about 2.1 mol. of water. To the resulting solution 175 cc. of sulfuric acid (100%) were added slowly with vigorous stirring. The resulting solution was heated on a steam bath under reflux for about 18 hours. At this time a precipitate had formed. The liquid was decanted off and the precipitate was dissolved in several liters of acetone. The resin was precipitated by pouring the acetone solution slowly into vigorously agitated cold water. The precipitated resin was redissolved in acetone and again precipitated in cold water. The reprecipitated resin was thoroughly washed with cold water and finally dried in the air. The resin was found to contain an acyl group content (calculated as vinyl acetate) equivalent to about 10.2% of the weight of the resin and a carboxyl group content (calculated as maleic acid) equivalent to about 6.6% of the weight of the resin.

EXAMPLE 3

*Normal propyl ester*

500 g. (2.7 mol.) of the heteropolymer of vinyl acetate and maleic anhydride were dissolved in 3500 cc. (47 mol.) of n-propyl alcohol and 50 cc. (2.8 mol.) of water by warming on a steam bath. To the resulting solution 150 cc. of sulfuric acid (sp. g. 1.84) were slowly added with stirring. The resulting solution was heated on the steam bath for about 18 hours. At this time a precipitate had formed. The liquid was decanted off and the precipitate dissolved in acetone. The resin was precipitated by pouring the acetone solution into vigorously agitated cold water. The precipitated resin was again dissolved in acetone and reprecipitated in water. Reprecipitation was continued until the resin was substantially neutral. The resin was then dried at room temperature. It was found to contain an acyl group content (calculated as vinyl acetate) equivalent to about 10.2 percent of the weight of the resin and a carboxyl group content (calculated as maleic acid) equivalent to about 3.5% of the weight of the resin.

EXAMPLE 4

*Normal primary butyl ester*

500 g. (2.7 mol.) of the heteropolymer of vinyl acetate and maleic anhydride were dissolved in 3400 cc. (37 mol.) of n-primary butyl alcohol and 50 g. (2.8 mol.) of water by warming on the steam bath. To the resulting solution were slowly added with stirring 150 cc. of sulfuric acid (sp. gr. 1.84). The resulting solution was heated on the steam bath for about 18 hours. At the end of this time a precipitate had formed. The liquid was decanted off. The precipitate was dissolved in acetone and the resin precipitated by pouring the acetone solution into vigorously agitated cold water. The precipitated resin was again dissolved in acetone and again precipitated in water. Reprecipitation as effected in this manner with the resin was substantially neutral. Finally to remove color the resin was warmed in ethyl alcohol, again dissolved in acetone and precipitated in water. The resin was dried in the air and found to contain an acyl group content (calculated as vinyl acetate) equivalent to about 2.2% of the weight of the resin and a carboxyl group content (calculated as maleic acid) equivalent to about 3.4% of the weight of the resin.

EXAMPLE 5

*Normal primary amyl ester*

1500 g. (6.1 mol.) of the heteropolymer of vinyl acetate and maleic anhydride were dissolved in 10 liters of n-primary amyl alcohol and 180 cc. (10 mol.) of water by warming at 70° C. To the resulting solution were added slowly with stirring 300 cc. of sulfuric acid (sp. gr. 1.84) dissolved in 300 cc. of n-primary amyl alcohol. The resulting solution was warmed at 70° C. for about 72 hours. At the end of this time a precipitate had formed. The liquid was decanted off. The precipitated mass was cut into small pieces and wrung to free it from amyl alcohol. It was there dissolved in 2 or 3 times its weight of acetone. The acetone solution was poured into vigorously agitated cold water to precipitate the resin. The precipitated resin was thoroughly washed with cold water and finally dried in an oven at 140° to 160° F. The resin was found to contain a carboxyl group content (calculated as maleic acid) equivalent to about 6.8% of the weight of the resin and an acyl group content (calculated as vinyl acetate) equivalent to about 8.8% of the weight of the resin.

EXAMPLE 6

*β-Methoxyethyl ester*

100 g. (0.5 mol.) of the heteropolymer of vinyl acetate and maleic anhydride were dissolved in 340 g. (4.5 mol.) of β-methoxyethyl alcohol by warming at 70° C. To the resulting solution were added 17 cc. of sulfuric acid (sp. gr. 1.84) dissolved in 83 cc. of β-methoxyethyl alcohol. The resulting mixture was warmed at 70° C. for about 72 hours. At the end of this time a precipitate had formed. The liquid was decanted off. The precipitated mass was cut into small pieces and wrung to free it from alcohol. It was then dissolved in 2 or 3 times its weight of acetone. The acetone solution was poured slowly into vigorously agitated cold water to precipitate the resin. The precipitated resin was thoroughly washed with cold water and finally dried in an oven at 140° to 160° F. The resin was formed to contain a carboxyl group content (calculated as maleic acid) equivalent to about 7% of the weight of the resin and an acyl group content (calculated as vinyl acetate) equivalent to about 0.4% of the weight of the resin.

A β-ethoxyethyl ester can be prepared in a similar manner.

EXAMPLE 7

*Mixed methyl normal primary butyl ester*

50 g. (0.27 mol.) of the heteropolymer of vinyl acetate and maleic anhydride in a mixture of 150 cc. (3.7 mol.) of methyl alcohol and 150 cc. (1.6 mol.) of normal primary butyl alcohol and 5 g. (2.8 mol.) of water. To the resulting solution were added 12 cc. of sulfuric acid (sp. g. 1.84) dissolved in 60 cc. of a mixture of equal volumes of methyl and normal primary butyl alcohol. The resulting solution was heated on the steam bath for about 15 hours. At this time a precipitate had formed. The liquid was decanted off. The precipitate was dissolved in 2 or 3 times its weight of acetone. The acetone solution was poured slowly into vigorously agitated cold water to precipitate the resin. The resin was redissolved in acetone and precipitated in water a second and a third time. The resin was finally air dried.

As shown in the foregoing examples, a single alcohol or a mixture of one or more alcohols can be employed. At least two molecular proportions of alcohol for each molecular proportion of heteropolymer are advantageously employed. It is further advantageous to use a very large excess of alcohol so that the reaction can be effected in solution in the excess of alcohol. Of course, non-alcoholic solvents can be employed in the reaction mixture if desired.

In treating the anhydride heteropolymers with alcohols it is advantageous to employ water. The presence of water facilitates solution of the heteropolymers in the alcohols and appears to facilitate the obtaining of resinous esters devoid of color. Up to about two molecular proportions of water for each molecular proportion of anhydride heteropolymer can advantageously be employed. Ordinarily, about one molecular proportion of water for each molecular proportion of anhydride is most advantageously employed.

Hydrochloric acid can be employed instead of sulfuric acid to accelerate our process. The acid catalyst accelerates not only the lactone formation, but the esterification and deesterification reactions as well. Sulfuric acid is advantageously employed.

Heat accelerates the formation of our new resins and while a variety of temperatures can be employed, the range from 50° C. to 100° C. is advantageously used.

Heteropolymers of vinyl organic acid esters and unsaturated α,β-dicarboxylic acids are well known in the art. The following examples will serve to illustrate their preparation.

EXAMPLE 8

*Heteropolymer of vinyl acetate and maleic anhydride*

500 g. (5.1 mol.) of redistilled maleic anhydride and 500 cc. (5.4 mol.) of redistilled vinyl acetate were placed in a 5000 cc. glass container equipped with a reflux condenser. The mixture was warmed at 60° C. until the anhydride had dissolved. 0.35 g. of benzoyl peroxide was added to the solution and the temperature was raised to 80° C. gradually, i. e., over a period of about 2 hours, the reaction mixture being stirred at intervals to facilitate solution of the benzoyl peroxide catalyst. When the vigourous reaction had subsided, heating was continued at 80° C. for a short time. The reaction mixture was allowed to cool and 3000 cc. of acetone were added thereto. The resulting mixture was shaken on a mechanical shaker until solution was complete. The resulting solution was then poured in a fine stream into benzine to precipitate the product as a white material.

EXAMPLE 9

*Heteropolymer of vinyl acetate and maleic anhydride*

43 parts (0.5 mol.) of vinyl acetate, 49 parts (0.5 mol.) of maleic anhydride and 0.1 parts of benzoyl peroxide were heated gently under reflux (cooling with an ice-bath when the reaction became too violent) until the mass set to a solid. The solid was dissolved in acetone. The acetone solution was poured into cool water to precipitate the heteropolymer. The precipitated white solid was squeezed free from water and allowed to dry in the air.

We have found that water precipitated heteropolymers of vinyl esters and maleic anhydride (such as described in Example 9) are advantageously employed in preparing our new resinous esters. It is also advantageous to effect the polymerization of vinyl esters and unsaturated $\alpha, \beta$-dicarboxylic acids or their anhydrides in the dark.

To prepare film or sheet from our new resins, we first dissolve about one part of the resin in from 2½ to 4½ parts (by weight) of a solvent such as acetone, a mixture of acetone and methyl alcohol, a mixture of methyl acetate and acetone, methyl acetate, ethyl formate or a mixture of ethyl formate and methyl alcohol for example. such a solution is then cast onto a film-forming surface, such as a metal or glass plate or a revolving drum to desired thickness and the resulting film or sheet is then allowed to dry. Drying may be facilitated by blowing warm air over the drying film or sheet. When sufficiently dry, the film or sheet is stripped from the film-forming surface and "cured" by treating with warm air. The "curing" removes the residual solvent, giving a transparent film or sheet of excellent properties for use as a support for light-sensitive photographic coatings. The resulting film or sheet can be coated directly with photographic emulsions or can be coated first with resinous or other "subbing" materials before the photographic emulsion is applied.

Film or sheet made from our new resins has many of the advantages of film or sheet made from cellulose nitrate and is an improvement thereover in that our film or sheet is of low inflammability. Film or sheet made from our new resins is an improvement over film or sheet made from cellulose esters particularly in resistance to moisture.

Our new resinous esters advantageously contain a carboxyl group content equivalent to not more than about 7% by weight of unsaturated $\alpha, \beta$-dicarboxylic acid and preferably the value is about 5% or lower. Our new resinous esters advantageously contain an acyl group content equivalent to not more than about 10% by weight of vinyl ester and preferably the value is about 5% or less.

Those of our new resinous esters prepared from the heteropolymer of vinyl acetate and maleic anhydride and primary monohydric alcohols of the formula $C_nH_{2n+1}OH$, wherein $n$ represents a positive integer not smaller than three, and having the aforesaid advantageous carboxyl and acyl group contents, give rise to film or sheet of particular efficacy as a support for light-sensitive photographic coatings. Our primary normal butyl ester is especially useful for such a purpose. Film or sheet made from the normal propyl ester, the normal primary butyl ester or the normal primary amyl ester is much more flexible and much more resistant to moisture than film or sheet made from the methyl or ethyl esters. The film or sheet made from the normal primary butyl or amyl esters is superior to the film or sheet made from the normal propyl ester. Film or sheet made from the normal primary butyl ester has a higher tensile strength than that made from the normal primary amyl ester.

While film or sheet made from our new methyl or ethyl resinous esters is not as flexible or as moisture-resistant as film or sheet made from the normal propyl, normal primary butyl or normal primary amyl esters, film or sheet made from mixed esters, such as the methyl-normal propyl, the methyl-normal primary butyl, the methyl-normal primary amyl, the ethyl-normal propyl, the ethyl-normal primary butyl or the ethyl-normal primary amyl esters, is superior to film or sheet made from the simple methyl or ethyl esters. Film or sheet made from the methyl-normal primary butyl or normal primary amyl esters is especially useful. The normal primary butyl or amyl ester group content of such particularly useful resinous mixed ester is advantageously equivalent to at least about 25 percent by moles of the total ester group content. The normal primary butyl-normal primary amyl mixed resinous esters are also very useful for the manufacture of film or sheet. Such film or sheet is possessed of high flexibility and high moisture resistance.

Thin film or sheet made from our new resinous esters (particularly the normal primary butyl) can be used as a wrapping material.

Film or sheet made from our new resinous esters is of high stability and does not need to be stabilized by incorporating antioxidants therein.

Our new resins can be extruded in the form of film or sheet or threads into a bath containing a non-solvent for the resins. The threads can be dried and spun to give yarn which shows a good affinity for basic dyes, such as the "Cellit," "Celliton," "Cellitazol," "Cibacete," "SRA," "Artisil" and "Calconese" brands, as well as such compounds of known basic structure as malachite green, safranine, Victoria blue 4R and methylene blue 4R.

Our new resinous esters can be subjected to hydrolysis by treating the resins in aqueous acetic acid in the presence of a mineral acid, such as sulfuric or hydrochloric, for example. Such a partial hydrolysis increased the carboxyl group content of our resins and increases the affinity of our resins for basic substances, including basic dyes. Such partially hydrolyzed products containing a higher carboxyl group content can be employed to form backings for photographic film. Thus, such products, together with a suitable dye, e. g. Rhodamine B, Crystal Violet B or Auramine, can be placed in solution in a suitable solvent and the solution coated on the back of a photographic film or plate and allowed to dry. The antihalation backing or layer so produced can be dissolved from the film or plate by alkaline developers.

Our new resins are compatible with cellulose derivatives e. g. cellulose nitrate and/or cellulose acetate. Thus, various proportions of cellulose nitrate and the butyl ester described in Example 4 (for example, 80 parts cellulose nitrate and 20 parts butyl ester) can be dissolved in a suitable solvent (for example, a mixture of equal parts of methyl alcohol and acetone) and the solution coated out on a film-forming surface. After drying, a clear film of good appearance is obtained.

Our new resins are also compatible with a number of other compounds. For example, our new resins are soluble in mixtures of ethylene formal and methanol and in mixtures of propylene oxide and methanol. Our new resins are also soluble in β-methoxyethyl formal. Our new resins are also compatible with the following compounds:

Benzophenone
Benzyl acetate
Benzyl alcohol
Benzyl benzoate
Benzyl ether
A mixture consisting of 60% monobenzyl glyceryl ether and 40% dibenzyl glyceryl ether
Benzyl hydrogen succinate
Benzyl phthalate
Benzyl succinate
Benzoxyethyl phthalate
Benzoxyethyl sebacate
Buxtoxyethyl tetrahydrofuroate
Ethyl adipate
Propyl adipate
Butyl adipate
Cyclohexyl adipate
Butyl benzoate
Butyl benzoxy acetate
Butyl carbamate
Butyl lactate
Butyl phthalate
n-Butyl sulfone
n-Butyl tartrate
o-Cresyl toluene sulfonate
Cyclohexyl acetate
Diacetin
Diamyl phthalate
Dibutyl succinate
Diethylene glycol monobenzyl ether
Diethylene glycol monobutyl ether
Diethylene glycol monobutyl ether butyrate
Diethylene glycol monobutyl ether cresoxyacetate
Diethylene glycol monobutyl ether phenoxyacetate
Diethylene glycol monobutyl ether succinate
Diethylene glycol dibutyrate
Diethylene glycol di isobutyrate
Diethylene glycol diproprionate
Diethylene glycol ditetrahydrofuroate
Diethylene glycol monoethyl ether
Diethylene glycol monoethyl ether acetate
Diethylene glycol monoethyl ether cresoxy acetate
Diethylene glycol monoethyl ether glycollate
Diethylene glycol monoethyl ether phenoxy acetate
Diethylene glycol monoethyl ether succinate
Diglycerol tetrapropionate
Di-isobutyl phthalate
Diphenyl ether
Ethoxy ethyl adipate
Methoxy ethyl adipate
β-Ethoxyethyl glycollate
Ethoxyethyl α-hydroxy isobutyrate
Ethoxyethyl lactate
Ethoxyethyl maleate
Ethoxyethyl phthalate
Ethoxyethyl sebacate
Ethyl benzoate
Ethyl phthalate
Ethyl m-toluene sulfonamide
Ethylene glycol
Ethylene glycol monobenzyl ether
Ethylene glycol monobutyl ether
Ethylene glycol di-isobutyrate
Ethylene glycol monoethyl ether acetate
Glycerol tribenzoate
Isoamyl carbamate
Isoamyl tartrate
Methoxyethyl glycollate
Methoxyethyl phthalate
Methyl adipate
Methyl methoxyethyl phthalate
Methyl phthalate
Monoacetin
Monochloronapththalene
Monocresyl diphenyl phosphate
Pentaerythritol tetra-acetate
Phenyl phthalate
Sucrose octabenzoate
Tetrahydrofurfural glycerol acetate
Tetrahydrofurfuryl adipate
Tetrahydrofurfuryl maleate
Tetrahydrofurfuryl oxalate
Tetrahydrofurfuryl succinate
Tetrahydrofurfuryl tetrahydrofuroate
Triacetin
Triamyl phosphate
Tributyl citrate
Tributyl phosphate
Tributyrin
Trichloro-tertiary-butyl alcohol
Tricresyl phosphate
Triethyl citrate
Triethylene glycol diacetate
Triethylene glycol dibutyrate
Triethylene glycol dipropionate
Trimethylene glycol tetrahydrofuroate
Triphenyl phosphate
Tripropionin
Camphor
Tribromo phenol Sheets of our new ester resins, particularly the normal primary butyl and amyl esters, containing certain of the above compounds are well suited as a laminating material for the preparation of safety glass. Sheets containing the following compounds in the amounts indicated are especially useful for such a purpose:

| Compound | Pounds of compound per pound of resinous normal primary butyl ester |
|---|---|
| Diethylene glycol monoethyl ether acetate | 0.3 |
| β-Ethoxyethyl lactate | 0.3 |
| Ethylene glycol monobenzyl ether | 0.3 |
| Diethylene glycol monoethyl ether phenoxyacetate | 0.3 |
| Diethylene glycol monobutyl ether | 0.3 |
| Ethylene glycol monoethyl ether α-hydroxyisobutyrate | 0.3 |

When suitably plasticized, our new resinous esters can be molded by injection or compression processes, or can be extruded into sheeting of various thicknesses by the ordinary extrusion processes.

What we claim as our invention and desire to be secured by Letters Patent of the United States is:

1. A resinous ester of a monohydric alcohol and the lactone of a heteropolymer of vinyl alcohol and an unsaturated α,β-dicarboxylic acid.

2. A resinous ester of a primary monohydric alcohol and the lactone of the heteropolymer of vinyl alcohol and maleic acid.

3. A resinous butyl ester of the lactone of the heteropolymer of vinyl alcohol and maleic acid.

4. A resinous ester of a primary monohydric alcohol containing at least four carbon atoms and the lactone of the heteropolymer of vinyl alcohol and maleic acid.

5. A resinous ester of normal primary butyl alcohol and the lactone of the heteropolymer of vinyl alcohol and maleic acid.

6. A resinous ester of normal propyl alcohol and the lactone of the heteropolymer of vinyl alcohol and maleic acid.

7. A resinous ester of ethyl alcohol and the lactone of the heteropolymer of vinyl alcohol and maleic acid.

8. A process for preparing a resinous ester comprising heating to reacting temperature one molecular proportion of a heteropolymer of vinyl acetate and maleic anhydride, with at least about two molecular proportions of primary monohydric alcohol and from about one to about two molecular proportions of water, in the presence of sulfuric acid whereby lactone formation occurs.

9. A process for preparing a resinous ester comprising heating to reacting temperature one molecular proportion of a heteropolymer of vinyl acetate and maleic anhydride, with at least about two molecular proportions of a monohydric alcohol and about one molecular proportion of water, in the presence of sulfuric acid whereby lactone formation occurs.

10. A film or sheet made from the resin of claim 1.

11. A thread made from the resin of claim 1.

12. A process for preparing a resinous ester comprising heating to reacting temperature one molecular proportion of a heteropolymer of a vinyl organic acid ester and maleic anhydride with at least about two molecular proportions of a primary monohydric alcohol and from about one to about two molecular proportions of water, in the presence of a mineral acid having a strength of the order of sulfuric acid, whereby lactone formation occurs.

13. A process for preparing a resinous ester comprising heating to reacting temperature one molecular proportion of a heteropolymer of vinyl acetate and maleic anhydride with at least about two molecular proportions of a primary monohydric alcohol and from about one to about two molecular proportions of water, in the presence of a mineral acid having a strength of the order of sulfuric acid, whereby lactone formation occurs.

JAMES G. McNALLY.
RUSSEL H. VAN DYKE.